United States Patent [19]

Kaas

[11] 4,372,860
[45] Feb. 8, 1983

[54] METHOD AND AN APPARATUS FOR CLEANING WATER IN A SWIMMING POOL

[75] Inventor: Povl Kaas, Herning, Denmark

[73] Assignee: H. & P. Kaas System Teknik ApS, Herning, Denmark

[21] Appl. No.: 237,776

[22] Filed: Feb. 24, 1981

[51] Int. Cl.³ .............................................. C02F 1/32
[52] U.S. Cl. .................................. 210/748; 219/326; 422/24; 210/169; 210/764
[58] Field of Search ............... 422/24; 210/169, 748, 210/764, 765; 219/326

[56] References Cited

U.S. PATENT DOCUMENTS

| | | | |
|---|---|---|---|
| 1,193,143 | 8/1916 | Henri et al. ........................... | 422/24 |
| 1,238,124 | 8/1917 | Frickey .................................. | 219/326 |
| 2,189,279 | 12/1940 | Bitner .................................... | 210/748 |
| 3,155,609 | 11/1964 | Pampel ................................. | 210/748 |
| 3,638,795 | 2/1972 | Feddern et al. ..................... | 210/169 |
| 3,766,060 | 11/1973 | Smith ................................... | 210/748 |
| 3,920,547 | 11/1972 | Garrison et al. .................... | 210/748 |
| 4,141,830 | 2/1979 | Laot ...................................... | 210/748 |
| 4,179,616 | 12/1979 | Coviello et al. .................... | 210/748 |
| 4,230,571 | 10/1980 | Dadd .................................... | 210/764 |
| 4,273,660 | 6/1981 | Beitzel ................................. | 210/764 |
| 4,274,970 | 6/1981 | Beitzel ................................. | 210/748 |

FOREIGN PATENT DOCUMENTS

| | | | |
|---|---|---|---|
| 2543418 | 4/1977 | Fed. Rep. of Germany . | |
| 2354971 | 6/1976 | France ................................. | 210/169 |
| 2307575 | 11/1976 | France . | |
| 1387909 | 4/1922 | United Kingdom ............... | 64/30 A |
| 1545595 | 9/1975 | United Kingdom ............... | 44/7 A |
| 1543225 | 4/1976 | United Kingdom ............... | 361/433 |

Primary Examiner—Charles N. Hart
Assistant Examiner—Sharon T. Cohen
Attorney, Agent, or Firm—Cushman, Darby & Cushman

[57] ABSTRACT

By a method and an apparatus for cleaning water in a swimming pool, the water is circulated successively through a plurality of flow chambers divided by partitions. In the front chamber bar-shaped heating bodies are located transverse to the flow direction of the water, and in the succeeding chamber ultraviolet radiation lamps are located transverse to the flow direction, said lamps radiating light at λ>300 nm. In a last chamber ultraviolet radiation lamps are located which radiate light at λ<300 nm. When the water passes through the container, skin squames and the like organisms collect on the heating bodies, whereas the ultraviolet radiation lamps in the chamber ensure such a disinfection that only a quite small amount of fresh water need to be supplied to the swimming pool. The ultraviolet radiation lamps serve to kill the bacteria resistant to chlorine.

11 Claims, 2 Drawing Figures

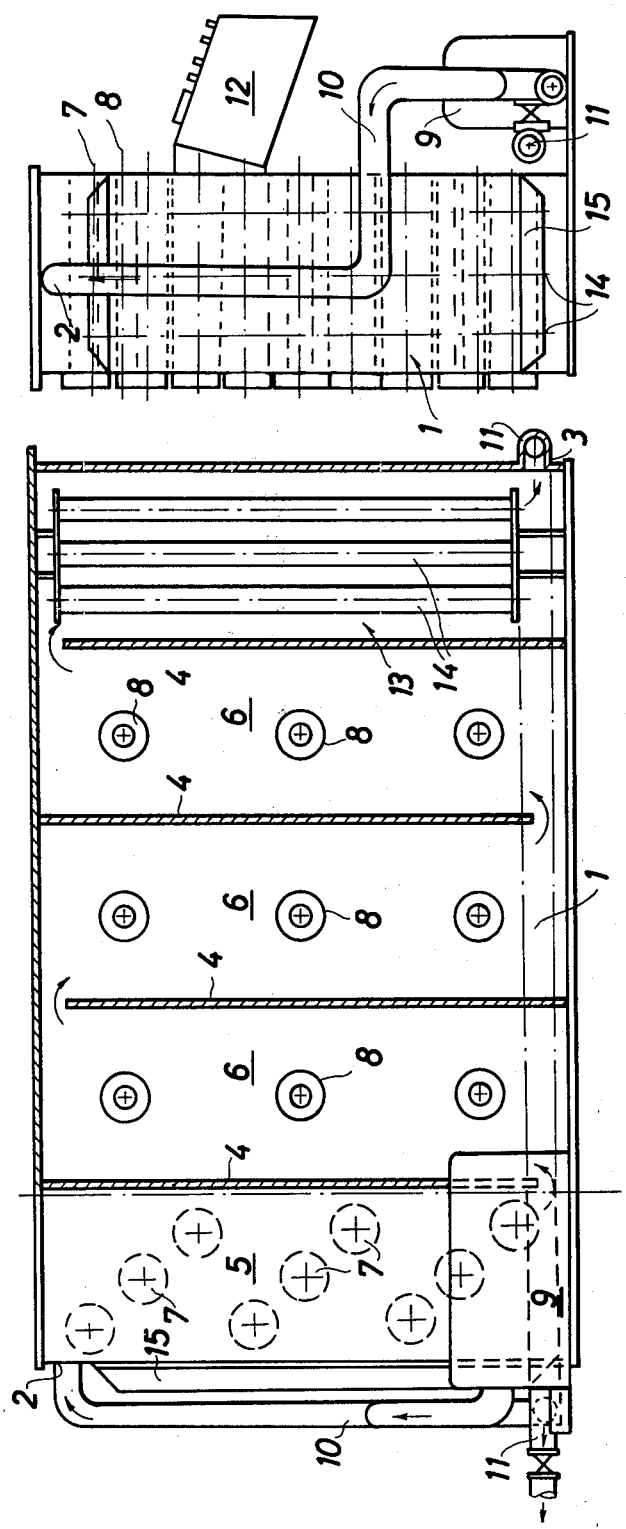

METHOD AND AN APPARATUS FOR CLEANING WATER IN A SWIMMING POOL

The invention relates to a method of cleaning chlorinated water in a swimming pool by circulating the water through a container, in which it is treated by ultraviolet radiation.

It is known that ultraviolet radiation is capable of killing germs, bacteria, sponges, spores and the like organisms in water, inter alia in swimming pools, and that the ultraviolet radiation decomposes chloramines formed in the water by reaction with organic substances such as carbamides. For purifying the water of skin squames and other solid substances, the water is carried through a filter while part of such solid substances present on the surface of the water is carried away with the water flowing through an overflow to a sewer. These known methods, however, require filters that are relatively expensive to mount and to run, inter alia because they often need a regeneration, and because the water consumption and consequently the calorie requirement for heating the water is high as it is often required that 10% of the water is replaced each day.

The object of the invention is to provide a method and an apparatus of the above type permitting a cleaning of the water in a swimming pool in an easier and more energy and water saving manner than previously.

The method according to the invention is characterized in that the water in the container is carried through a plurality of flow chambers connected in series in such a manner that in the first chamber the water is carried through a plurality of heating bodies located transverse to the flow, and in a plurality of succeeding flow chambers said water is treated by a plurality or ultraviolet radiation lamps with a predetermined radiation of light with the wave length $\lambda > 300$ nm.

Practical tests have furthermore proved that also organic chlorine compounds—organohalogens—such as chloroform $CHCl_3$, bromo dichloromonomethane, dibromomonochloromethane and bromoform are removed by use of the apparatus according to the invention, said compounds being known to be carcinogenic.

It turned out surprisingly that by means of this method it is possible to keep the water in a swimming pool clean without using particular filters such as active carbon filters, ozone devices etc., and without draining off the surface water to a sewer, and consequently without a supply of fresh water. Furthermore, the water is of a good quality and without an unpleasant smell and irritation of the mucous membranes in spite of the usual addition of chlorine as an oxidation reserve. The difficulties in using the usual filters have been avoided since skin squames and other impurities collect on the bar-shaped heating bodies when said bodies are arranged so tight and possess such a capacity that the surface of the heating bodies has a temperature exceeding 80° C. and may heat the passing water to provide an increase of temperature of the magnitude 1° C. When the heating bodies are burnished, e.g. electro-burnished, they may with the highest possible effect collect the impurities on their surfaces. The heating bodies have proved capable of preventing smudging and shimmying of the ultraviolet burners ($\lambda > 300$ nm) and consequently of preventing a loss of effect.

The addition of just a quite small amount of fresh water permitted according to the invention, may, however, imply that bacteria resistant to chlorine are prevailing in the bath water and thereby cause inflammation of the middle ear of the swimmers. This problem is, however, solved according to the invention by the water in a chamber located last in the flow direction being treated by ultraviolet radiation lamps with a predetermined radiation of light with the wave length $\lambda < 300$ nm. The combination of the ultraviolet radiation lamps with $\lambda > 300$ nm and the ultraviolet radiation lamps with $\lambda < 300$ nm and the bar-shaped heating bodies permits a cleaning of chlorinated water without problems, as the ultraviolet lamps with $\lambda > 300$ nm operating within the photochemical field, kill the bacteria by accelerating the germicidal effect of the chlorine, whereas the ultraviolet lamps with $\lambda < 300$ nm operating within the bactericidal field, kill the bacteria *Pseudomonas fluorescens* and *Pseudomonas acuruginosa* resistant to chlorine.

Beyond the saving advantage obtained by the fact that only a small amount of fresh water is to be heated, an additional and very considerable saving advantage may according to the invention be obtained by the fact that the heat energy developed during the start and running of the ultraviolet lamps with $\lambda < 300$ nm assists in heating the water in the flow chamber provided with heating bodies, and by the fact that the bar-shaped heating bodies are used as electric series resistances in the circuit to the ultraviolet radiation lamps with $\lambda > 300$ nm in the succeeding flow chambers.

The apparatus according to the invention is characterized in that the container between the inlet and the outlet is divided into a plurality of flow chambers connected in series, and that the chamber adjacent the inlet comprises a plurality of bar-shaped, optionally burnished heating bodies located transverse to the flow direction, and that at least one of the chambers succeeding in the flow path of the water comprises a plurality of ultraviolet radiation lamps with a predetermined radiation of light with the wave length $\lambda > 300$ nm and located in such a manner that they may radiate intensively the passing water.

The bar-shaped heating bodies are less expensive, far more durable and easier to clean than the filters usually used. The cleaning may be performed by a simple rinsing of the container, whereby the connection between the container and the swimming pool is interrupted and a flow of rinsing liquid optionally with the addition of a cleaning preparation is carried through the apparatus by means of an appropriate valve and pump arrangement.

In order to kill bacteria resistant to chlorine which may be prevailing when only a small amount of fresh water is added, a flow chamber arranged last in the flow direction of the water may according to the invention be provided with a plurality of ultraviolet radiation lamps with a predetermined radiation of light with the wave length $\lambda < 300$ nm for treatment of the water. Such a last flow chamber may easily be connected in series with the remaining flow chambers.

An embodiment according to the invention is characterized in that the heat developing electric components in the circuit, which supplies current to the ultraviolet radiation lamps with a predetermined radiation of light with the wave length $\lambda < 300$ nm, communicate in a heat-conducting manner with the water in the first flow chamber comprising the bar-shaped heating bodies. Furthermore, the bar-shaped heating bodies may according to the invention be electric resistances in the circuit, which supplies current to the ultraviolet radiation lamps with a predetermined radiation of light with $\lambda > 300$ nm. Such an apparatus has proved to provide an exceedingly great energy-saving, up to about 90% of the energy in the current supplied to the apparatus being converted into heat energy transferred to the pool water.

An efficient radiation of the water and a considerably room-saving are according to the invention obtained by the ultraviolet radiation lamps with a predetermined radiation of light with the wave length $\lambda > 300$ nm being tubular and located in the flow chambers transverse to the flow direction of the water, and by the ultraviolet radiation lamps with a predetermined radiation of light with the wave length $\lambda < 300$ nm being tubular and located in the flow chamber in the flow direction of the water. The container may be made relatively small as the ultraviolet radiation tubes with a predetermined radiation of light with the wave length $\lambda > 300$ nm for instance are of a length of 300 cm, whereas the ultraviolet radiation lamps with a predetermined radiation of light with the wave length $\lambda < 300$ nm are of a length of for instance 1 m, said lamps optionally being vertically located.

In order to obtain the maximum effect of the ultraviolet beams, the inner walls of the flow chamber are according to the invention preferably reflecting.

The bar-shaped heating bodies and the tubular ultraviolet radiation lamps may be arranged in an easily replaceable manner. The heating bodies may for this purpose according to the invention for instance comprise a centrally located electric heating element surrounded by an outer tube containing a heat transfer oil. As a result the surface temperature of the tubes may easily be adjusted.

The ultraviolet radiation lamps with a predetermined radiation of light with the wave length $\lambda > 300$ nm may for instance have a power consumption of 400 watt/h and a resistance of 37 ohm. They are not employed in the ozone-forming area, but have proved to be particularly efficient for decomposing chloramines.

The apparatus according to the invention renders it possible that the water when leaving the apparatus contains neither bacteria nor chloramines, and only negligible amounts of free chlorine. On the whole the use of the apparatus according to the invention has proved that the values expressing the quality of the bath water without difficulties may be kept on optimum values. In a running apparatus, a Redox-potential of approx. 750 mV has for instance been measured, and a content of independent chlorine of less than 0.1 mg/l as well as usual pH-values between 7 and 8. The turbidity or the brightness was correspondingly good, and the water had no unpleasant smell and did not irritate the mucous membranes.

Practical tests have furthermore proved that a usual sand filter with the addition of aluminum sulfate usually return flushed every week, upon mounting of the ultraviolet separator only need to be return flushed every fourth week. In practice this means that it may be assumed that the filter period may be prolonged with all other types of filters, the ultraviolet separator not depending on the filter type used.

The invention will be described below with reference to the accompanying drawing, in which FIG. 1 is a diagrammatic side view of the apparatus, partly in section, and FIG. 2 is an end view of the apparatus of FIG. 1.

The apparatus comprises a container 1 with an inlet 2 and an outlet 3, and it is divided into flow chambers 5, 6 by means of partitions 4. These flow chambers are mutually connected by slots or openings alternately located at the top and the bottom of the partitions 4, whereby the water entering the chamber 5 located first in the flow direction alternately flows upwards and downwards along a wavy flow path through the apparatus.

A plurality of bar-shaped heating bodies 7 are located in the front chamber 5, the surfaces of said heating bodies being burnished (electro-burnished). Each heating body comprises an electric heating element such as a spiral resistor surrounded by a heat transfer oil transferring the heat to the burnished surface. Glas-tube resistors are, however, particularly advantageous.

A plurality of tubular ultraviolet radiation lamps 8 with a predetermined radiation of light with the wave length $\lambda > 300$ nm are provided downstream in the succeeding chambers 6. These tubular lamps 8 extend transverse to the flow direction in each of said chambers. The heating bodies 7 and the ultraviolet radiation tubes 8 extend substantially across the entire width of each chamber.

In practice impurities such as skin squames, hair and the like organisms in the water have proved to collect on the burnished surfaces of the heating bodies 7 when said bodies are arranged in such a number and comprise such a capacity that they are capable of heating the entering water by 1° C., and have a surface temperature of for instance 80° C. Furthermore it appeared that by means of an appropriate—not overwhelmingly high-—number of ultraviolet radiation tubes with a predetermined radiation of light with the wave length $\lambda > 300$ nm located in the flow chambers 6 provided with the heavily reflecting walls, an efficient decomposition of chloramines and carbamides may be obtained in such a manner that the water leaving the container through the outlet 3 is particularly well suited as bath water. By continuously carrying part of the water in a swimming pool through the apparatus, it is thereby possible to avoid the necessary draining off of part of the water to a sewer, which would necessitate a supply and heating of fresh water. Furthermore, the use of filters, e.g. with active carbon for removing chloramines, or flow filters and other types of filters is avoided, the cleaning and regeneration of such filters often being difficult and time-consuming. The coating on the bar-shaped heating bodies 7 is removed from time to time by disconnecting the apparatus and the swimming pool, and subsequently by circulating rinsing water optionally with the addition of a cleaning preparation through the flow chambers and then draining off said rinsing water to a sewer together with the substances collected on the heating bodies. 7. This circulation of water is provided by a pump 9 usually drawing water from the swimming pool and through a tube 10 pressing said water to the inlet 2, through the container 1 and back to the swimming pool through a tube 11. By means of an appropriate valve arrangement the connection to the swimming pool is blocked, and the rinsing water is made circulating through the tubes 10 and 11 before being drained off to a sewer.

In the preferred embodiment of the apparatus according to the invention illustrated in the drawing, a flow chamber 13 is located after the flow chambers 6 and in series therewith. In this flow chamber a plurality of long tubular ultraviolet radiation lamps 14 with a predetermined radiation of light with the wave length $\lambda < 300$ nm are provided, which are active in killing bacteria resistant to chlorine, which may be prevailing in the bath water when only small amounts of fresh water are added. Coils and other heat developing electric components in the circuit supplying current to the ultraviolet radiation lamps 14 ($\lambda<300$ nm) are provided in a heater 15. This heater is located on the side of the flow chamber 5 in such a manner that the heat developed is transferred to the water passing by. The heating bodies 7 are electric resistors being series resistances in the circuit supplying current to the ultraviolet radiation lamps 8 ($\lambda>300$ nm). Such an apparatus permits a very high energy-saving, the majority of the energy in the current to the apparatus being converted into heat in the water passing through.

The running of the apparatus is controlled and adjusted from a control desk 12 provided with a trip control showing how long the apparatus has been running since the latest cleaning, a thermometer showing the temperature of the water leaving the chamber 5, and various ammeters and switch means for water and fuel pumps, the heating bodies 7 and the ultraviolet lamps 8.

A particularly advantageous embodiment of the apparatus according to the invention is characterised in that the bar-shaped heating bodies 7 are glass-tube resistors emitting light in the infrared radiation field. In this manner they highly assist in decomposing nitrogen chloride compounds, especially in decomposing creatine and creatinine.

The chemical reactions taking place when the separator is in function are the following:

(1) $HOCl+$light result in $HCl+O$, whereafter $O+O+$ light result in $O_2^*$ (oxygen in Statu nascendi), (2) $Cl_2+H_2O+$light result in $2HCl+O$, whereafter $O+O+$light result in $O_2^*$ (which in particular occurs when chlorine gas is added to the water), (3) $NO_3+$light result in $NO_2+O$, whereafter $NO_2+$light result in $NO+O$ and $O+O$ are converted into $O_2^*$. Each swimmer secretes approx. 50 ml $NO_2$ per hour, and this is oxidized immediately into $NO_3$ in the presence of a high oxidation potential inter alia provided by the separator, (4) the chloramine is oxidized and decomposed under influence of ultraviolet light by $\lambda>300$ nm into HCl, $H_2O$ and nitrogen.

In order to obtain a good bath water quality, the separator was mounted in swimming baths having great problems with the nitrogen compounds together with the chlorine forming the chloramines.

The chloramine content in indoor swimming baths is determined by the amount of creatinine and creatine supplied to the bath water by the swimmers, determined by the fresh water supply performed in the pool, and by the amount of water retained in the filter of the swimming baths.

A long range of examinations of swimming baths has proved a relation between the content of chloramines and the above quantities expressed by $$C_E=(k\cdot P-F)/Q$$

wherein $C_E$ is the chloramine concentration in a pool, whereby a state of equilibrium has set in between the supply of chloramine and the supply of fresh water, i.e. for a longer period the pool has had a constant concentration of chloramine. P is the number of swimmers in the pool per day, k is the amount of chloramine secreted by the swimmer into the pool, F is the amount of chloramine daily absorbed in the filter, Q is the amount of make-up water supplied per day, excl. evaporation. A condition for using a predetermined k-value in the expression for the concentration of equilibrium is, that k may be considered a quantity not changing in the course of time. The values measured in the swimming pool before the installation of the chloramine separator were the following:

Free chlorine 1.55 mg, chloramine content 1.35 mg, pH 7, 6, Redox-value 430 mv, other parameters were not measured in the swimming baths before the installation of the separator. As to addition of fresh water approx. 20 to 25 m³ of fresh water were used per day, excl. return flushing. The sand filter was return flushed one time weekly with a consumption of 80 m³ pool water. After the filter rinsing, 80 m³ of fresh water were added. The ventilating plant ran with the addition of 75% of fresh air. The smell in the swimming baths was influenced by a bad smell of chlorine. Nitrate ($NO_3$) corresponded to 4.2 mg/l, total N corresponded to 4.7 mg/l. KIF 2.8 mg oxygen/l.

After use of the chloramine separator for 9 months, the following constant values were obtained: Free chlorine 0.5 mg, chloramine content 0.2 mg, pH 7.3 mg, Redox 780 mv, supply of fresh water: only approx. 2-3 m³ fresh water per day on account of evaporation, return flushing of the filter with 80 m³ pool water every fourth week. The ventilating plant only runs with 20% supply of fresh air in order to keep the relative humidity at 60%. No smell of chlorine could be sensed in the swimming baths. It was not possible to reduce the chloramine content to less than 0.2 mg by means of the capacity of the separator used, said capacity being 25 m³. It should be assumed that this is due to a decomposition of a higher order during the conversion of the nitrogen compounds into free nitrogen. KIF is constant without an increase of 1.4 mg oxygen/l in mean value. It was not possible to measure nitrite $NO_2$ as it is not present at the high oxidation potential. Nitrate ($NO_3$) does not rise and is constant 1.7 mg/l. Total N is approx. 2.1 mg/l. The carbamide determinations have proved that the carbamide per liter water is very low and has a constant value of 0.18 mg/l. The bacteriological tests of the pool water have not changed after the installation of the chloramine separator. The following values have been observed: The average total number of germs in $3\times100$ ml pool water tests on bloodagar at 37° for 24 hours is less than 100 germs, *Pseudomonas fluorescens* on centrimidagar in 100 ml pool water at 21° for 52 hours have not been provable. By a test at membrane filtering 500 ml water for interococcere on difcointerococcusagar for 2 to 3 days at 37°, such have not been provable. By a test for coli-bacteria on emb-agar per 500 ml membrane filtered water, such have not been provable either.

On account of the separator plant, the swimming baths in question have been able to obtain an annual saving of 7000 m³ fresh water as well as an annual saving of 16000 m³ district heating water at 85° C.

This is especially a consequence of the fact that the air has been made recirculatable, and of the low chloramine content obtained.

Measurements of the content of organohalogens both before and after the separator have proved the following values for chloroform and bromoform:

| Chloroform | Test I | Before | 166 µg |
|---|---|---|---|
| " | Test I | After | 83 µg |

|  | Test II | Before | 149 μg |
|---|---|---|---|
|  | Test II | After | 49 μg |
|  | Test III | Before | 393 μg |
|  | Test III | After | 280 μg |
|  | Test IV | Before | 288 μg |
|  | Test IV | After | 221 μg |
| Bromoform | Test I | Before | 993 μg |
|  | Test I | After | 770 μg |
|  | Test II | Before | 910 μg |
|  | Test II | After | 413 μg |
|  | Test III | Before | 231 μg |
|  | Test III | After | 75 μg |

Measurements through gas chromatography have at the same time proved that dichloromonobromomethane and dibromomonochloromethane are removed in percentages relative to chloroform and bromoform.

Countless tests have proved that lumps of bacteria conglomerates are opened in the first chamber by infrared heating bodies. This implies that the chlorine being accelerated through the succeeding chambers has a great possibility of reaching the centre of the conglomerates on account of the structural opening. Furthermore it is an advantage that conglomerates resistant to chlorine are opened in the infrared heating chamber, whereby the germicidal light in the last chamber with $\lambda = 253.7$ nm may irradiate all the bacteria resistant to chlorine, said bacteria not being present in lumps.

The following nitrogen-fixed chloramines are present:

| Monochloramine | $NH_2Cl$ |
|---|---|
| Dichloramine | $NHCl_2$ |
| Trichloramine | $NCl_3$ | and the following organically linked chloramines are present:

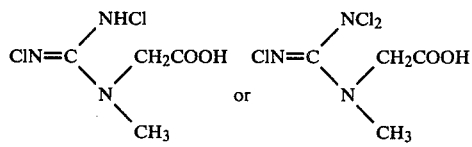

which is creatine-linked chloramine formed by creatine having the formula

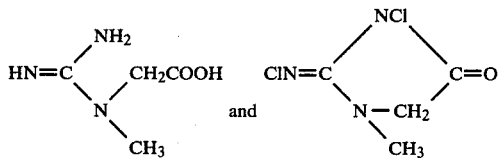

which is creatinine-linked chloramine formed by creatinin having the formula

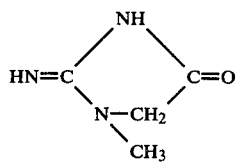

I claim:

1. A method of cleaning chlorinated water in a swimming pool by circulating the water through a container, in which it is treated by ultraviolet radiation, characterized in that the water in the container is carried through a plurality of flow chambers connected in series in such a manner that in the first chamber the water is carried through a plurality of heating bodies located transverse to the flow, and in a plurality of succeeding flow chambers said water is treated by a plurality of ultraviolet radiation lamps with a predetermined radiation of light with the wave length $\lambda > 300$ nm.

2. A method as claimed in claim 1, characterized in that the water in a chamber located last in the flow direction is treated by ultraviolet radiation lamps with a predetermined radiation of light with the wave length $\lambda < 300$ nm.

3. An apparatus for cleaning chlorinated water in a swimming pool and comprising a container (1), the inlet (2) and outlet (3) of which are connected with the pool in such a manner that the water from said pool may be circulated through the container, in which it is treated by ultraviolet radiation, characterized in that the container (1) between the inlet (2) and the outlet (3) is divided into a plurality of flow chambers (5, 6) connected in series, and that the chamber (5) adjacent the inlet comprises a plurality of bar-shaped, optionally burnished heating bodies (7) located transverse to the flow direction, and that at least one of the chambers (6) succeeding in the flow path of the water comprises a plurality of ultraviolet radiation lamps (8) with a predetermined radiation of light with the wave length $\lambda > 300$ nm and located in such a manner that they may radiate intensively the passing water.

4. An apparatus as claimed in claim 3, characterized in that a flow chamber (13) located last in the flow direction of the water is provided with a plurality of ultraviolet radiation lamps with a predetermined radiation of light with the wave length $\lambda > 300$ nm for treatment of the water.

5. An apparatus as claimed in claim 4, characterized in that the heat developing electric components (15) in the circuit, which supplies current to the ultraviolet radiation lamps (14) with a predetermined radiation of light with the wave length $\lambda > 300$ nm, communicate in a heat-conducting manner with the water in the first flow chamber (5) comprising the bar-shaped heating bodies (7).

6. An apparatus as claimed in claim 3, characterized in that the bar-shaped heating bodies (7) are electric resistors in the circuit, which supplies current to the ultraviolet radiation lamps (8) with a predetermined radiation of light with the wave length $\lambda > 300$ nm.

7. An apparatus as claimed in any one of claims 4 to 6, characterized in that the ultraviolet radiation lamps (8) with a predetermined radiation of light with the wave length $\lambda > 300$ nm are tubular and located in the flow chambers (6) transverse to the flow direction of the water, and that the ultraviolet radiation lamps (14) with a predetermined radiation of light with the wave length $\lambda < 300$ nm are tubular and located in the flow chamber (13) in the flow direction of the water.

8. An apparatus as claimed in any one of claims 4 to 6, characterized in that the inner walls of the flow chambers (5, 6, 13) are reflecting.

9. An apparatus as claimed in any one of claims 4 to 6, characterized in that each bar-shaped heating body (7) comprises a centrally located electric heating element surrounded by an outer tube containing a heat transfer oil.

10. An apparatus as claimed in any one of claims 4 to 6, characterized in that the bar-shaped heating bodies (7) are glass-tube resistors radiating infrared light in the radiation range $\lambda > 700$ nm with a predetermined radiation of light.

11. A method of cleaning chlorinated water in a swimming pool comprising withdrawing a stream of water from the swimming pool and passing the stream through a plurality of flow chambers connected in series, the water in the first flow chamber passing transversely across a plurality of smooth-surfaced elongated heating bodies which are at a temperature such that impurities in the water form a coating on the surfaces of the heating bodies, treating the water in a plurality of succeeding flow chambers by a plurality of ultraviolet radiation lamps emitting a predetermined radiation of light with the wave length greater than 300 nm to thereby accelerate the germicidal effect of the chlorine, treating the water passing through a further succeeding flow chamber by ultraviolet radiation lamps with a predetermined radiation of light with the wave length less than 300 nm to thereby kill bacteria which are resistant to chlorine, returning the water from the last flow chamber to the swimming pool, and while periodically interrupting the flow of swimming pool water to the flow chambers removing the coating from the heating bodies and passing the coating to waste.

* * * * *